No. 848,509. PATENTED MAR. 26, 1907.
F. THOMS.
AWNING.
APPLICATION FILED MAR. 13, 1906.
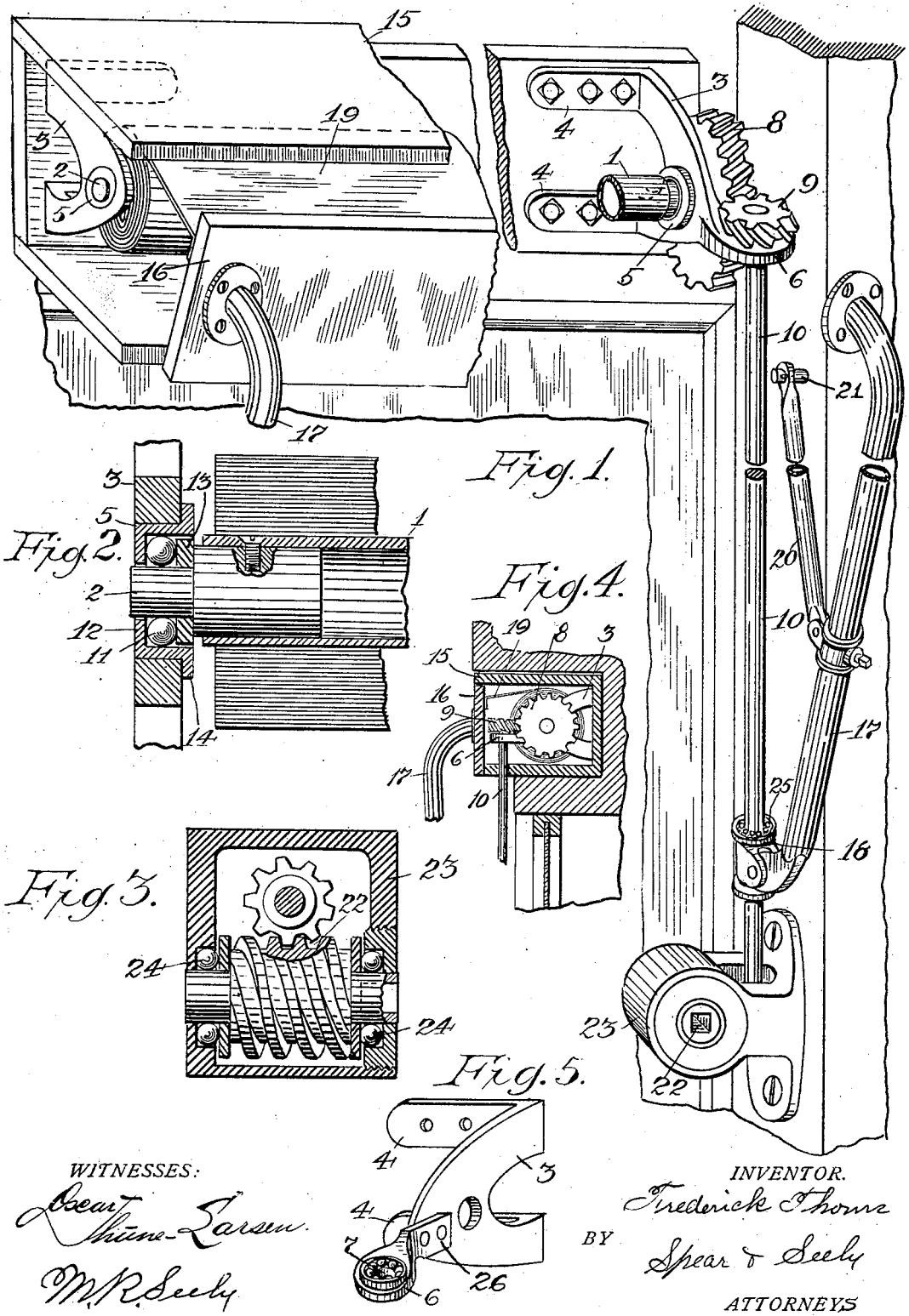
WITNESSES:
INVENTOR.
Frederick Thoms
BY Spear & Seely
ATTORNEYS

UNITED STATES PATENT OFFICE.

FREDERICK THOMS, OF SAN FRANCISCO, CALIFORNIA.

AWNING.

No. 848,509.   Specification of Letters Patent.   Patented March 26, 1907.

Application filed March 13, 1906. Serial No. 305,861.

*To all whom it may concern:*

Be it known that I, FREDERICK THOMS, a citizen of the United States, residing at San Francisco, in the county of San Francisco and State of California, have invented certain new and useful Improvements in Awnings, of which the following is a specification.

My invention relates to awnings, and more particularly to the mechanism for raising and lowering them.

In placing awnings upon buildings it frequently happens that they must be placed in positions in which it is very difficult, if not impossible, to actuate the roller by the ordinary mechanism, and recourse must be had to means which will permit of the vertical shaft standing in front of the awning shaft or roller instead of below it, as with the ordinary bevel-gearing. I accomplish this by providing a bracket in which the shaft-bearing is to the rear of the vertical bearing and using intermeshing spiral gear-wheels for transmitting motion to the shaft.

Another object of the invention is to provide antifriction-bearings which will avoid the necessity of oiling such places to prevent the wear and consequent friction by the exposure to moisture, as must occur where the parts are exposed to all kinds of weather.

Another object is to provide a housing which will protect the parts from the weather to which they would be otherwise exposed.

The accompanying drawings illustrate the invention.

Figure 1 is a broken perspective view of one form of apparatus. Fig. 2 is a sectional view of one end of the same. Fig. 3 is a horizontal sectional view of the lower operating mechanism. Fig. 4 is a longitudinal sectional view of the runner. Fig. 5 is a perspective view of a different form of bracket.

Referring more particularly to the drawings, 1 indicates the shaft or roller upon which the awning is wound. It is provided at its ends with the usual journals or gudgeons 2, which are rotatably mounted in brackets 3. The brackets are preferably A shape, with the bottom or inner end of each leg bent laterally at an angle to form a foot 4, which is perforated for the reception of the fastening means, as screws or bolts.

The bearings 5 for the journal of the roller 1 is near the apex of the bracket, substantially midway between the feet 4, which will give ready access to both feet, either above or below the shaft, as the case may be. The apex of the bracket is formed or provided with a flat ear or extension 6, which is perforated, as at 7, to form a bearing and lies in a plane below the bearing 5. The extension projects to the side of the plane of the bracket opposite the feet 4, which permits of the perforation 7 being located at said side of the bracket.

A spiral gear-wheel 8 is secured to the end of the gudgeon 2, which projects through one of the brackets and is engaged by another gear-wheel 9, that is secured to the upper end of a rod 10, that projects through the perforation or bearing 7. The top of the extension is flat and forms a seat or support for the gear-wheel 9, and by locating it below the bearing 5 and by locating the bearing 7 to one side of the plane of the legs of the bracket the axis of each wheel will lie in the plane, extended, of the the other wheel and the two axes will stand at right angles to each other.

The gudgeon at each end of the shaft is provided with suitable ball or antifriction bearings to take up the thrust or endwise friction of the shaft, as well as the radial friction in the bearing. One form of such bearing consists of a series of balls 11, mounted in a cup-like receptacle or holder 12, and a washer 13. The holder is inserted in the bearing from the inside and is prevented from passing entirely through it by a flange 14, and the end of the shaft engages with the washer, which is seated in the holder. Suitable antifriction-bearings may be placed in the bearing 7 and under the gear-wheel 9, as shown in Fig. 5.

The brackets, shaft, and gearing are preferably mounted in a box or housing 15, the front board 16 of which is removable and supported upon the free ends of two swinging rods or arms 17, the other end of said arms being each secured to a runner or casing 18, only one of which is shown, that is loosely mounted upon the vertical guide-rods 10. The awning-cloth 19, which is secured to and wrapped around the shaft 1, is connected at its free edge to the inside of the board 16, so as to be drawn down therewith, and when the awning is raised and the cloth wound up the board will thoroughly protect the same, preferably by fitting in under the top of the housing.

The rods 17 are pivotally secured to the free ends of two braces 20, which are rigidly secured thereto at one end, and at the other ends they are supported by pins 21. The rod 10 is rotated for raising or lowering the awning by suitable gearing 22, mounted in a casing 23, said gearing and also the runner or casing 18 being preferably provided with antifriction-bearing 24 and 25, respectively.

If desired, the extension can be made separate from the bracket, as shown at 26, so that the brackets can be made reversible and invertible, and the extension and gear-wheels can be applied to either bracket, so as to wind the shaft from either end.

As above described, my awning can be placed in recesses in buildings or to the rear of projections or ledges, which will prevent the use of the ordinary bevel-gearing for operating it, and when closed the cloth and gearing will be fully protected from the weather. The antifriction-bearings will render the operation of raising and lowering the awning very easy and will also avoid the need of lubrication, as is so frequently the case at present, and by utilizing the operating-rod 10 for the guide-rod of the awning-board arm 17 the structure is less complicated, and therefore less expensive to construct, than where the extra guide-rod must be used.

Having described my invention, I claim—

1. In an awning, a bracket having a vertical part and a forwardly-extending horizontal part, an awning-shaft journaled in the vertical part, a spiral gear on said awning-shaft, a vertical operating-rod passing through the horizontal part and carrying an intermeshing spiral gear, and means for rotating said operating-rod; the location of said rod being in front of and substantially in line with the end of the awning-shaft.

2. In an awning, an awning-shaft, an operating-rod geared thereto, an awning-supporting arm, a hinged brace-rod connected thereto, and a slide having a hinge connection with the lower part of said supporting-arm and movable vertically upon said operating-rod.

In testimony whereof I have affixed my signature, in presence of two witnesses, this 7th day of March, 1906.

FREDERICK THOMS.

Witnesses:
F. M. BARTEL,
W. S. BOYD.